Nov. 2, 1965  R. D. BISSELL ETAL  3,214,979
SHOCK RESISTANT INSTRUMENT
Filed Aug. 31, 1962
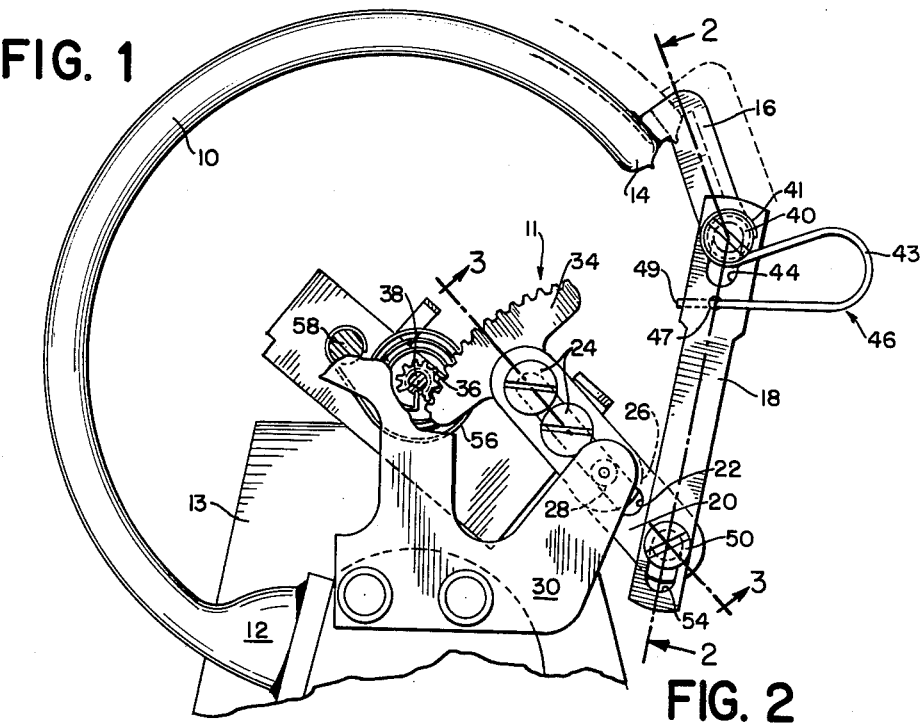
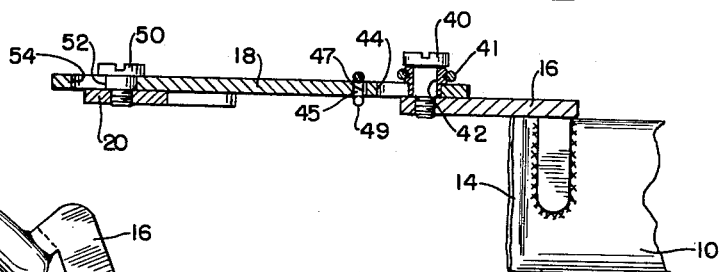
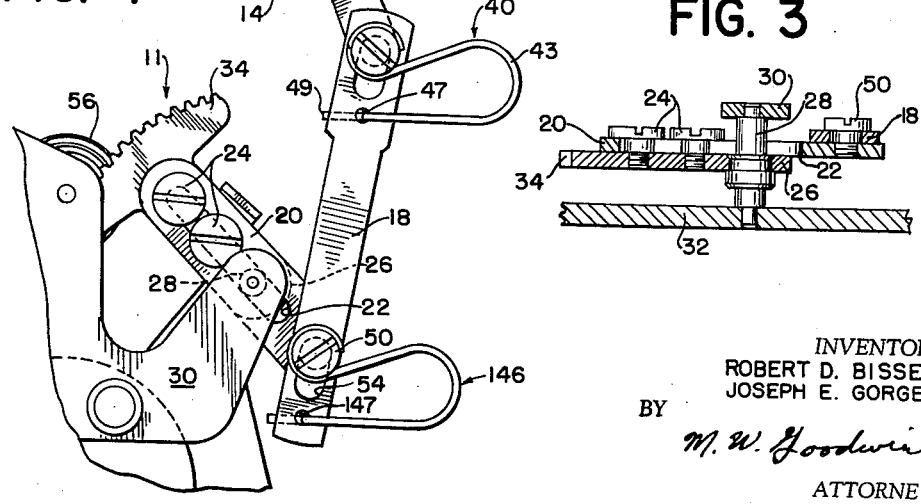
INVENTOR.
ROBERT D. BISSELL
JOSEPH E. GORGENS
BY
M. W. Goodwin
ATTORNEY 3,214,979
SHOCK RESISTANT INSTRUMENT
Robert D. Bissell, Orange, and Joseph E. Gorgens, Fairfield, Conn., assignors, by mesne assignments, to Dresser Industries, Inc., Dallas, Tex., a corporation of Delaware
Filed Aug. 31, 1962, Ser. No. 220,670
4 Claims. (Cl. 73—418)

This invention relates to instruments such as Bourdon tube pressure gauges and the like, and more particularly, to novel and improved means for improving the shock resistance of such instruments.

A well known construction for temperature or pressure responsive instruments utilize a Bourdon tube as a driving member which is deformable in response to changes in a condition sensed. More particularly, the Bourdon tube is filled with a fluid which undergoes a pressure change in response to changes in a condition sensed so as to cause the free end, or tip of the tube, to deflect in response to changes in a condition sensed. The tube tip is often connected to a driven member which, for example, may be a pointer associated with a dial face. A well known mechanism, or movement, for connecting the Bourdon tube and pointer includes a pinion mounted for movement with the pointer and driven by a gear segment which is drivingly connected to the Bourdon tube tip. Such instruments have been widely used and found to be satisfactory for most applications. However, when such an instrument undergoes high acceleration force, serious damage to the gauge movement may occur.

Accordingly, it is the object of this invention to provide a novel and improved instrument of the type described which will have improved resistance to shock or high acceleration forces, especially with regard to the mechanism, or movement, connecting the pressure responsive driving member and the driven member.

Other objects will be in part obvious, and in part pointed out more in detail hereinafter.

The invention accordingly consists in the features of construction, combination of elements and arrangements of parts which will be exemplified in the construction hereafter set forth and the scope of the application of which will be indicated in the appended claims.

In the drawings:

FIG. 1 is a fragmentary plan view of the pressure sensing element and movement of a pressure responsive instrument embodying the present invention;

FIG. 2 is a fragmentary cross-sectional view substantially along the line 2—2 of FIG. 1;

FIG. 3 is a fragmentary cross-sectional view substantially along the line 3—3 of FIG. 1; and FIG. 4 is a fragmentary plan view of the pressure sensing element and movement of a pressure sensing instrument embodying a modified form of the present invention.

With reference to the drawing, and particularly FIGS. 1-3, there is shown the pressure sensing element 10 and movement, generally indicated at 11, of a pressure responsive gauge of the Bourdon tube type. It will be understood that the mechanism shown in FIG. 1 is normally enclosed in a housing or casing although the same has not been shown. Also, it will be understood that the instrument usually further comprises a dial face across which is movable a pointer which, as will be further explained, is drivingly connected to the Bourdon tube. More particularly, an instrument of a type with which this invention is concerned comprises a driving member which in the case of the embodiment of FIG. 1, is a Bourdon tube 10. One end 12 of the Bourdon tube is adapted to be connected by suitable means to a source of pressure; for example, a pressurized fluid may be introduced within the Bourdon tube. The end 12 of the Bourdon tube is fixed relative to a bracket 13 by means of which the Bourdon tube and associated movement 11 connecting the tube to the pointer may be mounted on the instrument housing. The Bourdon tube further has a closed end 14 which is free to deflect, for example between the solid and broken lines shown in FIG. 1, in response to a change in a condition, such as the pressure of the fluid within the tube.

Mounted on the free end 14 of the Bourdon tube is a bracket 16. A link 18 is pivotally mounted at one end on the bracket 16. The other end of the link 18 is pivotally connected to one end of a slide member 20. As shown in FIGS. 1 and 3, the slide 20 has an elongate slot 22 extending longitudinally of the slide and through which extends a pair of slide screws 24. Each of the slide screws has a threaded end threadably engaged in a gear segment 26 which underlies the slide 20. Thus, the length of the slide 20-gear segment 26 sub-assembly may be adjusted. The gear segment is pivotally mounted by a shaft 28 which is supported and journalled at its opposite ends by a top plate 30 and a bottom plate 32 forming the frame for the instrument movement. The gear segment 26 further comprises an arcuate toothed portion 34 which meshes with a pinion 36 mounted for movement with a pointer shaft 38 on which is mounted a pointer (not shown). Thus, it will be seen as the tip 14 of the Bourdon tube deflects in a generally counterclockwise direction, as viewed in FIG. 1, corresponding to an increase in pressure of the fluid in the tube 10, the pointer shaft 38 will be rotated in a clockwise direction.

As can be seen from FIG. 1, when a high acceleration force is imposed on the tube 10 or movement 11 such as to tend to cause the tube 10 to deflect in either direction of normal movement, the inertia of the various elements of the movement 11 can result in forces being imposed on the connecting links and the various pivots which are of sufficient magnitude to cause serious damage. Therefore, in accordance with the present invention, the bracket 16 is connected to the link 18 by a resiliently yieldable lost motion driving connection so that in one direction of movement of the Bourdon tube under high acceleration forces, the tube tip will be permitted to move relative to the link 18 and reduce the shock loading on the linkage. Also, in accordance with the present invention, the link 18 is connected to the slide 20 by a resiliently yieldable lost motion driving connection which permits relative movement between the link and slide corresponding to a direction opposite that of the direction of relative movement between the link 18 and the bracket 16.

More specifically, the bracket 16 is connected to the link 18 by a pivot member or screw 40 which, as shown in FIG. 2, has a threaded end engaged in the bracket 16. A bushing 42 is mounted intermediate the ends of the screw 40. The bushing journals the screw 40 and is slidably received in an elongate slot 44 in the link 18. The slot 44 extends parallel to the longitudinal axis of the link 20. A spring 46 is mounted at one end on the bushing 42 and at the other end on the slide 18. The spring 46 is a loop spring in the form of a length of resilient wire having one end 41 wound about the bushing 42 in engagement with a circumferential groove on the bushing 42. The other end portion of the spring is bent at right angles to the link 18 to provide an anchoring portion 45 which extends through an aperture 47 in the link 18. Said other end of the spring terminates in a portion 49 which extends generally parallel to the general plane of the spring and is disposed on the opposite side of the link from the remainder of the spring to maintain the anchoring portion 45 in the aperture 47. The end of the springs are connected by a bight portion 43 which lies in a general plane parallel to the general plane of the link 18.

The spring 46 urges the pivot screw 40 into engagement with the upper end of the slot 44, or in other words, in a direction corresponding to deflection of the Bourdon tube in a counterclockwise direction. Thus, when the Bourdon tube deforms due to an increase of pressure of the fluid within the tube, there will be a positive drive between the tip bracket 16 and the link 18. The spring 46 is preloaded in order to maintain the pivot member 40 in positive driving relation with the upper end of the slot 44 and provides a sufficient biasing force to prevent relative movement between the bracket and link during normal operation of the gauge. In other words, the spring 46 is preloaded sufficiently to compensate for friction in the various pivots so that if the tip 14 of the Bourdon tube moves in a clockwise direction as viewed in FIG. 1, during normal operation of the gauge, the spring 46 will maintain the pivot member 40 in positive driving relation with the upper end of the slot 44. However, the spring 46 will permit relative movement between the bracket 16 and link 18 in the event of an abnormal force being imposed on the Bourdon tube or link 18, with the magnitude of the force sufficient to cause relative movement being determined by selected preloading of the spring 46. Where it is desired only to protect the gauge movement against relatively high acceleration loads, the preloading of the spring 46 may be substantially in excess of that required merely to assure that the pivot member 40 remains at the upper end of the slot 44 during normal operation of the instrument. However, where it is desired, for example, to eliminate oscillation of the pointer due to pressure fluctuation, the spring 46 will be preloaded, an amount nominally only sufficient to assure that the pivot member 40 will remain in positive driving relation with the upper end of the slot 44 during normal operation of the instrument.

It will, of course, be observed that the resiliently yieldable lost motion connection between the link 18 and the bracket 16 only serves to protect the instrument from forces acting in directions corresponding to one direction of relative movement between the bracket and link. More particularly, there will be protection only against forces acting to cause the link and bracket to move toward each other. In order to protect against acceleration forces in directions, for example, tending to separate the bracket 16 and link 18, a second resiliently yieldable lost motion driving connection is provided between the lower end of the link 18 and the slide 20. This structure is similar to the lost motion connection previously described in that it comprises a pivot member or screw 50 having a threaded end threadably engaged with the slide 20 and an intermediate portion 52 slidably engaged in an elongate slot 54 at the lower end of the link 18, all as shown in FIG. 2. As clearly shown in FIG. 1, the screw or pivot member 50 is engaged with the upper end of the slot 54 and the slot 54 extends in alignment with the slot 44 at the upper end of the link. The pivot member 50 is maintained in engagement with the upper end of the slot 54 by means of a hairspring 56, which as shown in FIG. 1, is connected at its inner end to the pointer shaft 38, and at its outer end to a post 58 fixed relative to the frame 13. The hairspring is wound and preloaded so that it will bias the pointer shaft in a clockwise direction as viewed in FIG. 1. Accordingly, the spring biases the gear segment 34 in a counterclockwise direction, thus tending to maintain the pivot member 50 against the upper end of the slot 54.

It is realized that hairsprings have heretofore been used to bias pinions in gauge movements of the type described in order to eliminate backlash in the system. However, in the present invention, the hairspring serves the further purpose, in cooperation with the pivot member 50 and slot 54, of providing a resiliently yieldable lost motion driving connection between the link 18 and the slide 20. It should be noted that the hairspring 56 tends to move the link 18 in an upward direction as viewed in FIG. 1 so as to tend to cause relative movement between the pivot member 40 and link 18. In this connection, the preloading of the hairspring 56 should be such that the biasing force on the pivot member 50 is less than the opposite force exerted on the slide 18 by the spring 46. The spring rates of the spring 46 and 56 will, of course, be substantially less than the spring rate of the Bourdon tube so that these springs will not result in any material inaccuracies in tube movement.

Thus, it will be seen that during normal operation of the gauge, the pointer shaft 38 will move in response to and coincidentally with movement of the Bourdon tube tip. Accuracy of movement is maintained inasmuch as the pivot members 40 and 50 are at all times maintained in positive driving relation with the upper ends of the slots 44 and 54 so that the distance between centers of the pivot members remains constant. However, should an acceleration force of relatively high magnitude tend, for example to cause displacement of the Bourdon tube tip in a clockwise direction as viewed in FIG. 1, the pivot member 40 will move toward the pivot member 50 and relative to the link 18 to absorb the shock. When the acceleration force has been removed, the spring 46 will assure that the pivot 40 is returned to its normal position. Also, for example, should an acceleration force tend to move the Bourdon tube tip in a counterclockwise direction, the link 18 will be moved upward and away from the pivot member 50 due to the lost motion resiliently yieldable driving connection at the lower end of the link. The hairspring 46 will assure proper repositioning of the pivot member 50 and link 18. It should also be noted that the mounting of the spring 46 on the bushing 42 permits the spring to be preloaded in a substantial amount without imposing any friction forces on the pivot 40 which would tend to interfere with normal operation of the instrument. In other words, while the spring force imposed on the bushing 42 may tend to cause frictional resistance to movement of the bushing in the slot 44, the pivot 40 is free to turn within the bushing 42 with only such frictional resistance imposed on it as would be the case if the spring 46 were not present. Thus, it can be seen that the spring 46 does not in any way detract from the accuracy of the instrument.

In FIG. 4, an alternative embodiment of the invention is disclosed wherein the hairspring 56 is not relied upon to provide the resiliency to the lost motion driving connection between the screw 50 and link 18. Rather, a loop spring 146 similar to the spring 46 previously described, has one end wound around a bushing, similar to the bushing 42 previously described, which is mounted on the pivot member 50. The other end of the spring 146 extends through an aperture 147 in the link 18 adjacent to end of the slot 54 opposite the end of the slot engaged by the pivot member 50. The spring 146 is preloaded in the same manner and for the same purpose as the spring 46 previously described to maintain the pivot member 50 in engagement with the upper end of the slot 54. In all other respects, the instruments shown in FIG. 4 is the same in structure and function as the embodiment of FIG. 1 and will thus not be further described.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

We claim:

1. In an instrument of a type including a pressure responsive member having a driving portion movable in opposite directions in response to a change in pressure, and a driven member; means for drivingly connecting the driven member and the driving portion, comprising a driven gear, a gear segment meshed with said driven gear, a link having a pair of longitudinally spaced and aligned slots, a first pivot member received in one slot and drivingly connected to said segment, a second pivot member received in the other slot and drivingly connected to said driving portion, a bushing slidably received in said other slot and rotatably mounting said second pivot member, preloaded resilient means urging the first pivot member in one direction longitudinally of the link and toward one end of its respective slot, and a preloaded spring connected at one end to the link and engaged at its other end with said bushing and urging said bushing in said one direction longitudinally of the link and into engagement with an end of said other slot.

2. In an instrument of the type including a pressure responsive member having a driving portion movable in opposite directions in response to a change in pressure, and a driven member; means for drivingly connecting the driven member and driving portion comprising a driven gear, connected to said driven member, a pivoted gear segment meshed with said driven gear, a link having a pair of longitudinally spaced and aligned slots, a first pivot member received in one slot and drivingly connected to said segment, a second pivot member drivingly connected to said driving portion, a bushing slidably engaged in said other slot and journalling said second pivot member, spring means urging the first pivot member toward one end of said one slot, and a preloaded spring connected at one end to the link and engaged at its other end with said bushing and urging said bushing into engagement with one end of said other slot, said preloaded spring being a loop spring comprising a bight portion lying substantially in the general plane of the link with one end of the spring being wound around said bushing and the other end of the spring being drivingly connected to said link.

3. In an instrument of the type including a pressure responsive member having a driving portion movable in opposite directions in response to a change in pressure, and a driven member; means for drivingly connecting the driven member and the driving portion, comprising a driven gear, a pivoted gear segment meshed with said driven gear, a link having a pair of longitudinally spaced and aligned slots, a pair of bushings slidably received in said slots, a pair of pivot members respectively journalled in said pair of bushings, one of said pivot members being connected to said driving portion, the other said pivot members being connected to said gear segment, and a pair of loop springs respectively associated with said pair of bushings, each loop spring having one end engaged in a circumferential groove on the respective bushing and another end anchored to the link, said bushings being urged in the same direction longitudinally of the link and each being engaged with an end of its respective one of said slots.

4. In an instrument of the type having a drive member movable in opposite directions in response to changes in condition, and a driven member; means drivingly connecting said driving and driven members comprising a link having a pair of slots extending in the same direction, a pair of pivot members received in said slots for movement longitudinally thereof, said pivot members being connected respectively to said driving and driven members, a bushing slidably engaged in one of said slots and journalling the pivot member associated with said slot, a spring connected at one end to said link and at the other end engaged with said bushing to urge the same into engagement with one end of said one slot, a second bushing slidably engaged in the other slot and journalling the other pivot member, and a second preloaded spring connected at one end to said link and engaged at its other end with said second bushing and urging said other pivot member in the same direction as the first bushing is urged by the first spring.

References Cited by the Examiner
UNITED STATES PATENTS

| | | | |
|---|---|---|---|
| 292,169 | 1/84 | MacGregor | 73—414 X |
| 1,195,750 | 8/16 | Trane | 73—411 X |
| 1,290,375 | 1/19 | Shaw | 73—414 |
| 1,839,077 | 12/31 | Adams | 73—411 |
| 2,047,581 | 7/36 | Grissett | 73—415 X |
| 2,665,584 | 1/54 | Bacon | 73—411 |

FOREIGN PATENTS 537,198  12/55  Italy.

RICHARD C. QUEISSER, *Primary Examiner.*

JOSEPH P. STRIZAK, *Examiner.*